Oct. 10, 1950 — F. ROESCH — 2,525,460
MARINE PROPULSION PLANT
Filed April 25, 1944 — 3 Sheets-Sheet 1
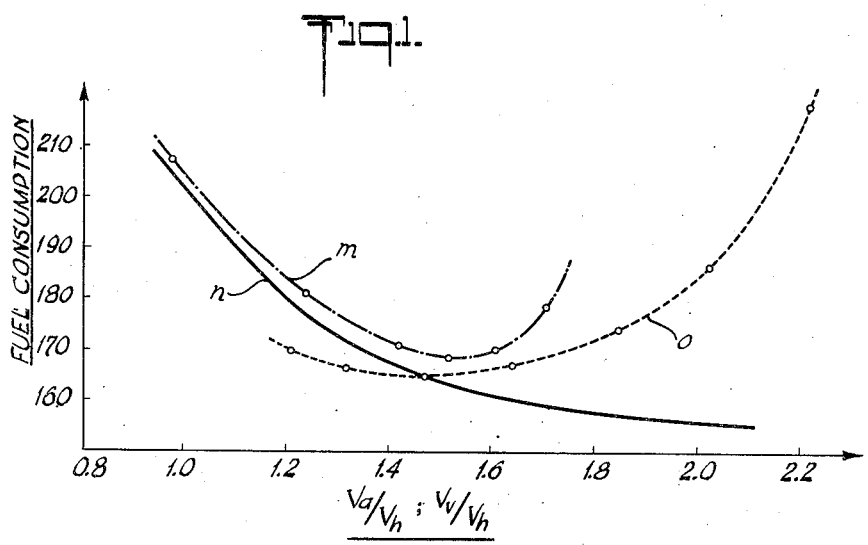
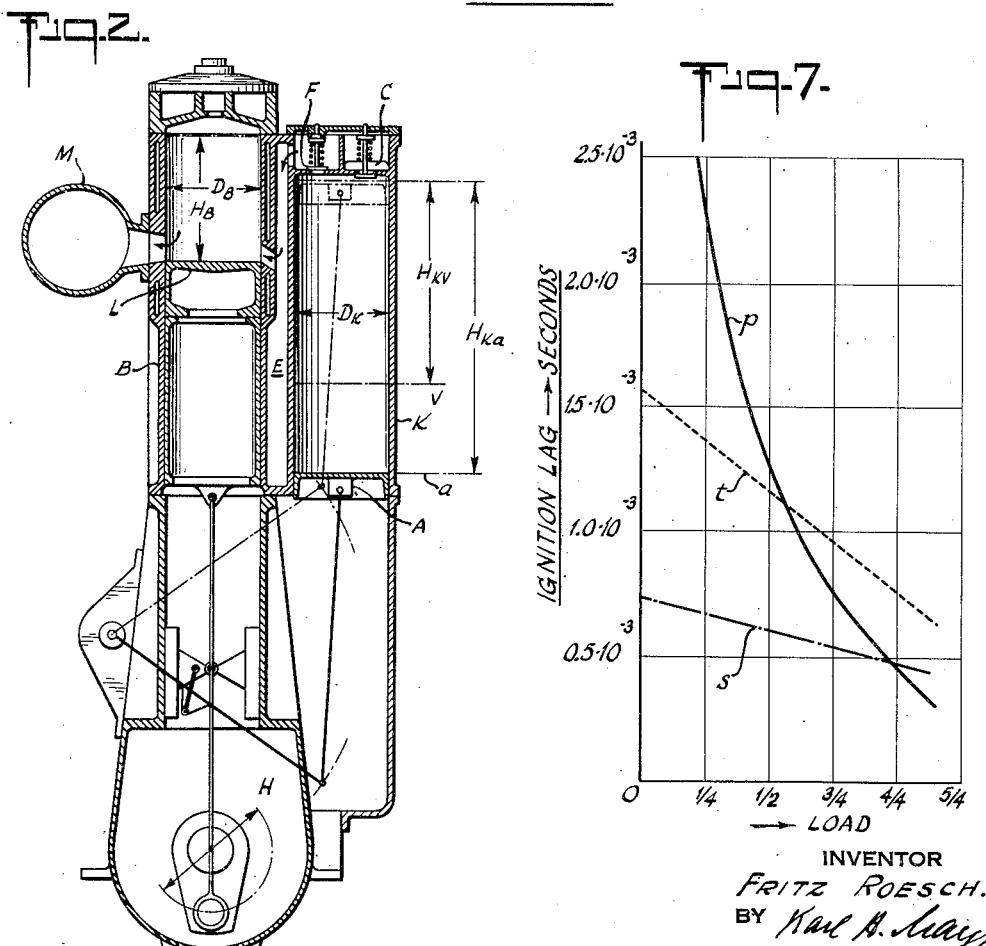
INVENTOR
FRITZ ROESCH.
BY Karl B. Mayr
ATTORNEY

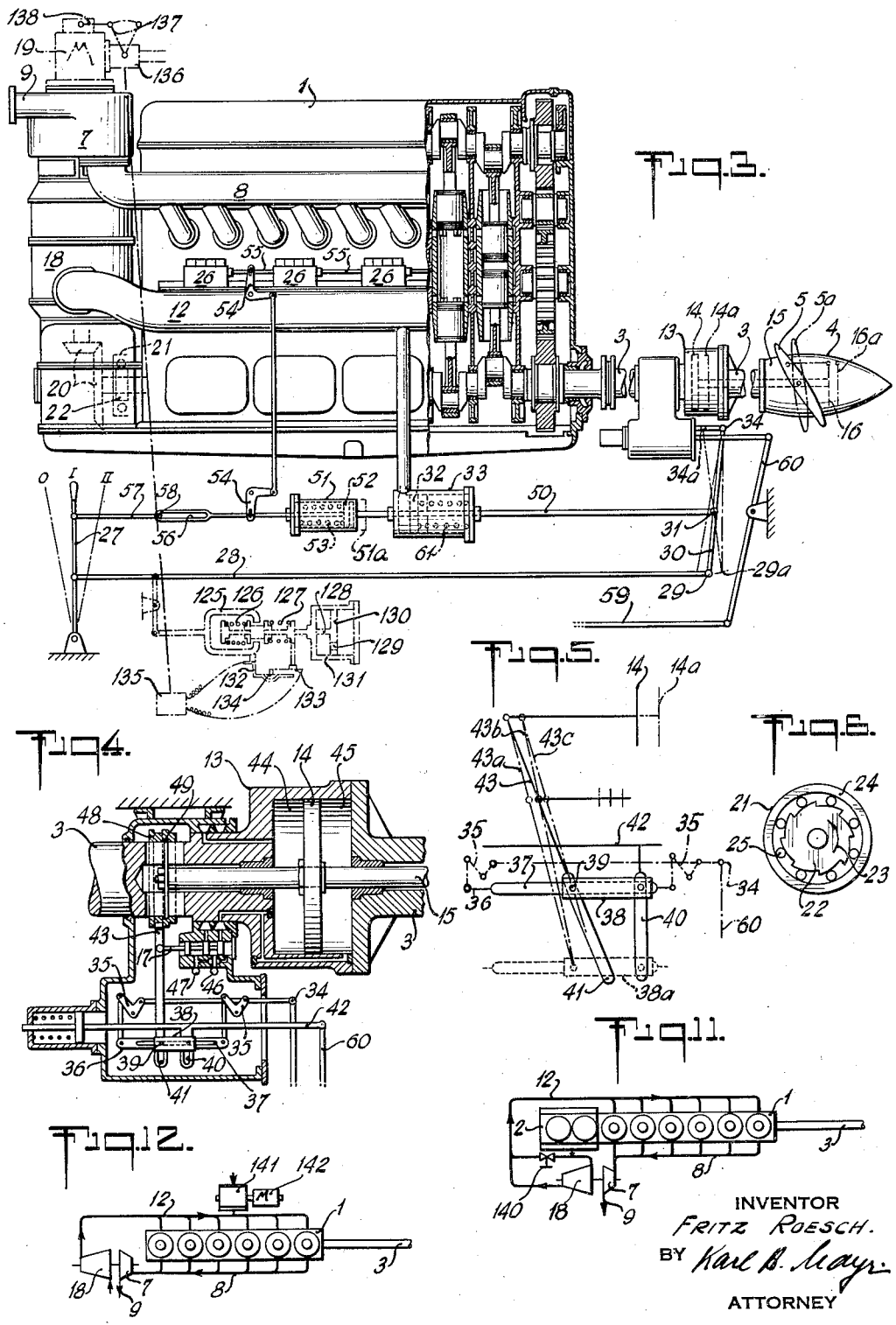

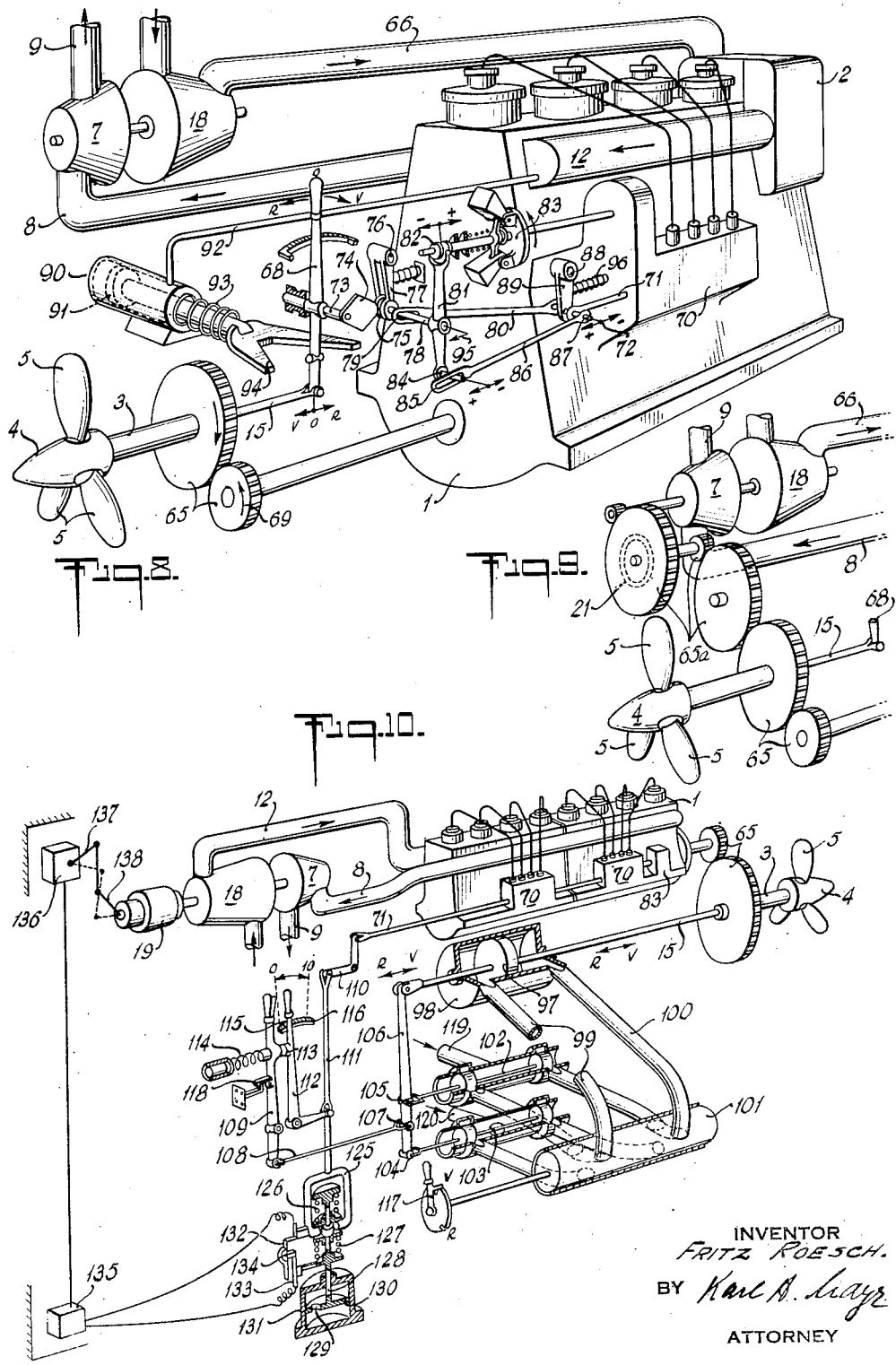

Patented Oct. 10, 1950

2,525,460

UNITED STATES PATENT OFFICE 2,525,460

MARINE PROPULSION PLANT

Fritz Roesch, Lucerne, Switzerland

Application April 25, 1944, Serial No. 532,663

8 Claims. (Cl. 170—135.72)

The invention relates to a marine propulsion plant, its purpose being to make high propulsion powers possible in an economic way while at the same time avoiding an excessive thermal or mechanical stressing of the internal combustion engines.

The development of marine propulsion is leading to higher speeds and thus to higher powers. When ships are re-engined, however, in spite of the higher power required, it is necessary that the previous engine weight should if possible not be exceeded, while in new vessels low weight and small dimensions of the engine are a primary aim. This makes possible for the new engines, as opposed to the larger and heavier engines employed hitherto, a much greater freedom in the installation of the plant in the vessel, so that space can be used which is not very suitable for cargo. Even in high-powered plants, the arrangement of the engine room amidships is no longer a necessity, so that this space can now be employed as useful space.

The power of internal combustion engines can be increased not only by an increase in the speed, but also by an increase of the mean effective pressure $p_m$. The latter is obtained by increasing the quantity of fuel injected into the combustion cylinder. The maximum quantity of fuel for full power, however, is limited by a definite quantity of air, which must be greater than the quantity of air theoretically necessary for combustion.

In modern marine engines an increase in the fuel quantity would be possible only if the quantity of air customary up to date could be more completely utilized. This, however, would raise the temperatures in the cylinder and thus the thermal stressing of the engine. In order to keep this stressing low, it is possible to increase the customary quantity of air by supercharging. However, the greatest economic and thermal advantages of supercharging fall only within certain fixed limits. It is clear that a low supercharging pressure corresponds to a low load on the engine and a high supercharging pressure to a high load.

In marine propulsion certain difficulties stand in the way of the application of supercharging. These difficulties lie in the fact that the acceleration of the ship by the main engine is limited in the following way. At the moment when the load on the internal combustion engine should be increased, the supercharging pressure corresponds to the prevailing load and not to the new load and the fuel supply is customarily set to the maximum quantity corresponding to the prevailing supercharging pressure. Rapid acceleration of the engine and thus of the ship by increasing the fuel supply alone is thus only possible at the cost of marked thermal overloading of the engine.

As the shafting, the propeller and the ship itself have to be accelerated with the internal combustion engine until the supercharging pressure corresponds to the new load, the excessive thermal stress on the engine in marine service is not only very high but also lasts a considerable time. Thus, on the one hand, such overstressing must be avoided at all costs for the sake of the reliability in service of marine plant, and the acceleration through an increase in the fuel supply alone can therefore only be small. On the other hand, good manœuvrability and the attainment of high average speeds over the whole of a voyage demand as high an acceleration as possible in marine service.

In order to fulfill the requirements both of reliability and of high acceleration, it is proposed in the present invention to provide one or more two-stroke internal combustion engines with a turbine driven by their exhaust gases and a supercharging plant, which latter draws in during one revolution of the engine or engines a quantity of air whose volume in its suction state is twice the swept volume of the combustion cylinder or more, but in its compressed state does not exceed twice the swept volume, the engine being coupled to a propeller with blades adjustable during service.

While the special type of supercharging makes possible the desired increases in power and/or decreases in weight but still remains within economic limits, the difficulty of low acceleration of the vessel is overcome in such a plant by the effect of an adjustment of the propeller blades co-ordinated in time with the supercharging process. The fact that the required normal speed of the vessel is reached more quickly offers the advantage of a shortening of the total time for the voyage, which is of economic value, for instance, in the case of ferries and mail-boats making many calls.

A further effect which is attained at the same time is that in this plant, as opposed to plants with supercharged internal combustion engines and propellers of nonvariable pitch, a too pronounced fall of the supercharging pressure can be avoided by an appropriate adjustment of the propeller blades.

In the drawings, several exemplifications of the invention are shown diagrammatically.

Fig. 1 shows curves for the fuel consumption under various supercharging conditions.

Fig. 2 gives the comparison between the suction and compressed air volume in the supercharged plant and the swept volume of the engine.

Figs. 3–6 show a device for successively effective regulation and some details.

Fig. 7 shows the relationship between ignition lag and power.

Figs. 8 and 10 illustrate two-stroke internal combustion engines with combined regulating and blade adjusting devices for limiting the pressure drop in dependence on the supercharging pressure.

Figs. 9, 11 and 12 illustrate variations of details in Figs. 3, 8 and 10.

The curves $m$, $n$ in Fig. 1 show the fuel consumption $b$ for various ratios of the volume of air $Va$ drawn in by the compressor to the swept volume $Vh$ of the combustion cylinder. The curve $m$ shows that the fuel consumption $b$ in grams/B. H. P.-hour of a normal non-supercharged two-stroke engine rapidly takes on, above the ratio $Va/Vh=1.6$, values which are no longer economically admissible.

The curve $n$ applies for a supercharged two-stroke internal combustion engine working according to the invention in which the fuel consumption $b$ in grams/B. H. P.-hour, in contrast to that in non-supercharged two-stroke engines, continues to decrease above the ratio $Va/Vh=1.6$. If, therefore, the limiting value of at least double the swept volume $Vh$ of the combustion cylinder is used for the air volume $Va$ drawn in by the compressor during one revolution of the crankshaft of the engine, that is $Va/Vh \geq 2$, then the internal combustion engine will receive at all loads, and in particular when starting, the quantity of air which is necessary in order to make possible undisturbed service.

According to the curve O, Fig. 1, the fuel consumption $b$ in grams/B. H. P.-hour also changes when there is a change in the ratio of the volume of air delivered by the compressor in its compressed stated $Vv$ to the swept volume $Vh$. The fuel consumption $b$ also memains within economic limits when the volume of air $Vv$ delivered during one revolution of the crankshaft of the engine is such that in its compressed state it is equal to or less than twice the swept volume $Vh$ of the combustion cylinder, while from the limiting value $Va/Vh=2$ onwards it begins to increase rapidly and becomes uneconomical. An economic fuel consumption is thus obtained when the two ratio limits are observed.

In order to give a clear representation of the relationship of the volumes, Fig. 2 shows a section through a two-stroke internal combustion engine with one compressor cylinder for each combustion cylinder. The supercharging plant of such a multicylinder engine thus includes all the compressor cylinders K together, whose suction volume $Va$=the number of cylinders × the length of stroke × the area of piston surface=$z.H_{Ka}.D^2{}_K/4\pi$, and thus the swept volume $Vh$ of the combustion cylinder=$z.H_B.D_B{}^2/4\pi$. The compressor piston A draws the air through the suction valve C during the downward stroke, and compresses it during the compression stroke from the lower dead centre, the line $a$, until the piston A has reached the line $v$ corresponding to the pressure in the supercharging air container E. Then the delivery valve F opens and the air is forced out into the container E. During the downward stroke of the combustion piston L, the exhaust ports open into the exhaust pipe M, to which an exhaust gas turbine is connected. Thereupon scavenging and supercharging air flows out of the container E through the admission ports into the combustion cylinder B. Since a compressor cylinder K is provided for each combustion cylinder B and the diameters of both are equal, $D_B=D_K$, the volumes to be compared can be represented by the shaded rectangles. The strokes $H_{Ka}$ of the compressor piston A, from the lower to the upper dead centre, and $H_{Kv}$, from the line $v$ up to the upper dead centre, and the stroke of the combustion piston B : $H_B$, provide a direct method of measuring the volumes $Va$, $Vv$ and $Vh$. Then, for instance, $H_{Ka}=2.3H_B$ and $H_{Kv}=1.6H_B$.

The eight-cylinder two-stroke internal combustion engine 1 with opposed pistons in Fig. 3 has an exhaust-gas turbine 7 connected to the exhaust pipe 8, and the exhaust gases from this turbine pass to the atmosphere through the pipe 9. The turbine 7 drives the compressor 18, forming together the supercharging plant. The compressor 18 is connected to the combustion cylinders through the super charging pipe 12. The crankshaft of the engine 1 provides the compressor 18, through the reduction gear 20 and the overtaking coupling 21, with a supplementary drive in case the power from the turbine 7 should be too small. The quantity of fuel to be injected is measured by means of the fuel pumps 26 and supplied to the combustion spaces of the cylinders of engine 1.

The internal combustion engine 1 drives the propeller 4, whose blades 5 can be adjusted during service. For the sake of clarity, only one of the two, three or four blades is shown.

In contrast to the customary method of control of variable pitch propellers, the control in the present case is such that, when the output of the two-stroke Diesel engine is increased a temporary increase in the speed of the engine is obtained without any increase of its torque, or of the fuel quantity injected, by means of a lowering of the pitch of the blades the speed increase being co-ordinated in time with the increase of output, and in this way excess thermal stressing is avoided. This increase in speed raises the speed of the supercharging plant, so that the supercharging pressure is also raised. The fuel quantity to be injected can now also be augmented, and the torque of the propelling engine rapidly increases and accelerates the ship correspondingly. In view of the rise in the supercharging pressure, the speed of the engine could now be further increased. If this is not desired, however, the pitch of the propeller blades can, corresponding to the increase in pressure, be entirely or approximately returned to the value prevailing before the change in the speed of the ship.

The device shown in Fig. 3 works as follows:

The adjusting member 27 is brought, for a given speed of travel of the ship, from the zero position 0 into, for instance, the position I. If now the speed of travel is to be increased, then the lever 26 is turned, for instance, from I to II and by means of the rod 28 displaces the hinge 29 of the lever 30 into the position 29a. The lever 30 turns about the fulcrum 31, which is rigidly connected to the piston 32 in the cylinder 33, so that the hinge 34 comes into the position 34a.

To the hinge 34 are connected the bell-cranks 35 (Fig. 4), which displace the rail 36 with the slot 37 transversely. On the rail 36 is a slide piece 38 with two pins 39, which engage both with the slot 37 and with the slots 40 and 41 and thus connect the rod 42 with the return lever 43. To the lever 43 is linked the control member 17 which connects the cylinder spaces 44 and 45 of the servomotor 13 either with the pressure oil supply pipe 46 or with the drain pipe 47. Further, the upper end of the return lever 43 is connected by means of the collar 48 and the pin 49 with the adjusting rod 15 and is adjusted in accordance with the position of the piston 14 or the blades 5.

Through the displacement of the hinge 34 into the position 34a, the slide piece 38 is moved by means of the rail 36 into the position 38a, Fig. 5, and the pins 39 move downwards in the slots 40 and 41, so that the return lever 43, turning about the hinge on the collar 48, arrives in the position 43a. The control member 17 then moves to the left and connects the space 44 with the supply 46. The piston 14 moves into the position 14a and lowers the pitch of the blade 5 which comes into the position 5a (Fig. 3). Meanwhile the control member 17 is returned by the lever 43 into the closing position, as the lever 43 comes into the position 43b, Fig. 5.

The internal combustion engine 1 can now increase its speed without any change of the fuel quantity or of the torque, since with the lower pitch the torque absorbed by the propeller 4 is smaller. The speed of the supercharging set 7, 18 rises, as the overtaking coupling 21, at the increased speed of the engine 1, provides a supplementary drive for the turbine 7 and with it the compressor 18. Now the pressure in the supercharging pipe 12 and in the cylinder 33 rises.

On the one hand, as soon as the supercharging pressure rises, the fuel quantity is increased, for the piston 32 is coupled through the rod 50 to the casing 51 of the elastic member 51—53, the spring plate 52 of which is connected through the lever 54 with the member 55 of the fuel pumps 26, which member adjusts the quantity of fuel to be injected into the cylinders of the engine 1. The piston 32, which is more highly loaded, moves to the right in opposition to the pressure of the spring 61, so that the casing 51 comes into the position 51a and the adjusting member 55 moves to the left.

On the other hand, the piston 32 now displaces the fulcrum 31, and with it the hinge 34, to the right. Therefore the slide piece 38 comes from the position 38a back to its original position 38 and turns the return lever 43 into the position 43c (Fig. 5), which lever moves the control member 17 to the right, and thus the space 45 is connected to the supply pipe 46 and the space 44 to the drain pipe 47. The piston 14 returns from the position 14a to the position 14 and turns the blade 5 from the position 5a (Fig. 3) into the original position 5. Through the return motion the member 17 is brought into the closing position. The return lever arrives in the original position 43, Fig. 5.

For decreasing the speed of travel, it is sufficient to decrease the fuel quantity alone without adjusting the blades 5. The elastic system 51 to 53 serves for this purpose. If the lever 27 is moved from the position II towards the position 0, the cylinder 51 remains in its position 51a corresponding to the position II of the lever 27. The spring plate 52, on the other hand, moves to the left, so that the spring 53 is compressed. The lever 54 is connected to the lever 27 by the slot 56 and the rod 57. When the lever 27 is moved to the left, the end 58 of the rod 57 carries with it the slot 56, and turns the lever 54, so that the adjusting member 55 moves to the right so as to decrease the fuel quantity. When, however, the lever 27 is moved to the right, the end 58 of the rod 57 moves freely in the slot 56, so that the fuel filling is only changed in accordance with the increase of the supercharging pressure.

In order to enable the variable pitch propeller 4 to be adjusted from running ahead to running astern or to some fixed intermediate pitch for continuous running, the rod 59 is adjusted by hand or by an adjusting member not shown in the drawing. The lever 60 displaces the rod 42 with the slot 40 and thus the slide piece 38 with the pins 39, which are guided in the slot 37 and carry with them the return lever 43 and the control member 17.

In Fig. 6 the overtaking coupling 21 is shown. The inner part 22 is connected to the crankshaft of the engine 1 and turns in the direction of the arrow 23. The outer part 24 is connected to the reduction gear 20. If the temperature or the pressure of the exhaust gases, or both, are low, then the speed of turbine 7 falls. If the speed falls below the value which corresponds to the speed of the crankshaft and the transmission ratio of the gear 20, the speed of the part 22 is beyond the speed of the part 24 until the rollers or balls 25 couple the two parts, as shown in Fig. 6. Then the engine 1 provides the lacking power.

In non-supercharged Diesel internal combustion engines no difficulties have presented themselves as a result of the ignition lag or of any change in it, particularly at part load. A rightly adjusted, non-supercharged internal combustion engine works also at part loads without giving trouble, because the combustion air can be drawn in from the surrounding atmosphere in the same condition and in an unchanged quantity at all speeds of rotation and whether the engine is working at part load, full load or overload. For this reason the state of the compressed charging air in the combustion space undergoes no change worthy of mention when the load changes, and the ignition lag is the same at all part loads and overloads. In supercharged internal combustion engines the conditions are different, since as a result of the lower speed of the compressor at part load the combustion air is precompressed to a considerably less extent and the compression pressure in the combustion space of the working cylinder is therefore greatly diminished. The temperature of the combustion air also falls with its compression pressure. This decrease in pressure and temperature occurs whether a rotary or a reciprocating compressor is employed, and whether the compressor is coupled to the crankshaft or not.

Recent investigations indicate that the magnitude of the ignition lag in internal combustion engines depends for the most part only on the pressure and the temperature of the combustion air into which the fuel is injected. All other attributes, as for instance the type of fuel, the shape of the ignition chamber, the temperature of the fuel and other similar features, are of quite minor significance and exert scarcely any influence on the ignition lag.

If a supercharged internal combustion engine intended for marine propulsion is run at part load for the purpose of slowing or turning the vessel, then its speed of rotation is decreased. The decrease of speed is accompanied by a decrease in the pressure and temperature of the combustion air in the combustion space. The result is that the ignition lag increases to several times the length of the normal ignition lag.

The fuel which has collected in the combustion space during the time the ignition is delayed, will all burst into flame together when ignition occurs. When the ignition lag is very considerable, an unusually large quantity of fuel will have collected and will be suddenly fired. Such ignitions have the character of detonations and cause a steep rise of pressure and thereby knocking of the engine. Additional stresses arise in the casing and in the running gear, and rapid wear of the engine therefore occurs.

Since in supercharged internal combustion engines, in view of the increased maximum pressures at normal speed, the compression ratio in the internal combustion cylinder must also be kept low, there is a danger that cylinders may misfire altogether at low speeds of the engine. Low atmospheric temperatures, fuels which do not ignite easily and other accompanying circumstances will further increase this danger. The running of the engine will then be impaired to such a degree that not only is the output decreased out of all proportion but in some circumstances it may prove impossible to keep the engine working at all. It then either runs with some cylinders misfiring or stops altogether. For the same reason the starting-up of supercharged engines is rendered more difficult, a fact which may seriously endanger the vessel during manœuvres.

The difficulties encountered in plants with supercharged internal combustion engines, as described above, are overcome by the present invention in the following manner: the device for adjusting the propeller blades and the control or governing device of the internal combustion engine are coupled to each other by an automatic device in such a way that, when the vessel's speed is decreased, the speed of the internal combustion engine is so adjusted by the setting of the propeller blades that the pressure of the supercharging air cannot fall below 60% of the pressure above the atmospheric pressure at full load.

When the method proposed in the invention is used, the absolute temperature of the combustion air does not fall below 85% of that at full power. In this way the ignition lag at decreased speed of the vessel and even at complete stoppage can be kept at least below three times the length of the ignition lag at normal power. Within this range the running of the internal combustion engine is not impaired to such a degree that any undesirable or disadvantageous effect would be apparent in the handling of the vessel or that damage would be done to the machinery plant. The invention thus makes an important contribution to the reliability of propelling plant with supercharged internal combustion engines and renders the service of such plant to a large extent independent of the type of fuel used.

The curves plotted in Fig. 7 apply to supercharged engine plants with a supercharging pressure of about 2 atm. abs. The size of the internal combustion engine, the form of its ignition space, the fuel used and other considerations are here of only very slight influence.

The full-line curve $p$ (Fig. 7) shows the ignition lag for a supercharged internal combustion engine driving a non-adjustable propeller. The speed of rotation here changes in accordance with the well-known parabolic propeller law. At about half power the ignition lag of such an engine plant has already increased to three times the normal figure. In accordance with the falling supercharging air temperatures which accompany the speed decrease, the ignition lag increases much faster at powers below ½ the full power. It reaches five times the normal value and even higher figures, in which case the ignition of the fuel takes place very late and in the form of a detonation accompanied by knocking, or it may even be doubtful if it will take place at all. A propelling plant equipped with highly supercharged internal combustion engines and non-adjustable propellers can scarcely be kept running at outputs less than ¼ of the full power.

Curve $s$, the chain-dotted line, shows the conditions when the engine drives an adjustable propeller the blades of which are so set that the speed of the engine remains at all outputs the same as at full power. A slight increase in the ignition lag occurs here too, but lies within limits in which the reliable running of the supercharged internal combustion engine is assured and there is no danger from violent ignition. The engine can be started up at speeds which ensure immediate ignition.

Curve $t$, the broken line shows the behaviour of the ignition lag when the adjustable propeller is set so that it is rotated at only about 80% of the normal speed. In accordance with the decreased speed, this broken curve $t$ lies above the chain-dotted curve $s$, but almost the whole of it lies below three times the ignition lag of a normal engine at full load. Even at this lower speed, the ignition lag falls in a region where the engine can be relied on to start up satisfactorily.

The internal combustion engine 1 in Fig. 8 drives, through toothed gear 65, a propeller 4, the blades 5 of which can be turned about a radial axis by means of devices shown in Fig. 3 or by hand.

The two-stroke internal combustion engine 1, Fig. 8, is provided with a supercharging plant which comprises the exhaust-gas turbine 7, the blower 18 driven by this and the reciprocating compressor 2 driven from the crankshaft of the engine 1. The exhaust-gas pipe 8 conducts the exhaust gases from the engine 1 to the turbine 7, from which they escape through the exhaust pipe 9. The blower 18, which may be designed as a centrifugal, radial or axial blower or as a combination of these types, and which may have one or more stages, forms the first stage of the supercharging plant and delivers the air through the pipe 66 to the compressor 2, which compresses it further and delivers it to the combustion cylinders through the pipe 12, which may be designed as a supercharging air receiver.

The device for adjusting the propeller blades is operated with the aid of rod 15 and lever 68. At the central position "0" of the lever 68 as shown in the drawing, the blades 5 are set perpendicular to the axis of rotation of the propeller 4, so that when the propeller 4 rotates they do not exert any force either in the form of a forward or a backward drive. When the lever 68 is moved over in the direction of the arrow V, the propeller blades are set so that, when the crankshaft of the internal combustion engine turns in the direction of the arrow 69, the vessel moves ahead. When the lever 68 is adjusted in the direction of the arrow R, the vessel is propelled astern.

The fuel pump 70 is adjusted by means of rod 71. An adjustment in the + direction of the double-headed arrow 72 increases the fuel feed, while an adjustment in the — direction decreases the quantity of fuel.

The device for adjusting the propeller blades, consisting of rod 15 and lever 68, and the control or governing device of the internal combustion engine of which rod 71 forms part, are coupled to each other by an automatically acting device in such a way that, when the speed of the vessel is decreased by setting the propeller blades, the speed of the internal combustion engine can be adjusted so that the pressure of the supercharging air in pipe 66 cannot fall below 60% of the pressure above atmosphere at full power.

Lever 68 carries upon its axis of rotation 73 a cam 74 upon which the roller 75 of a lever 77, mounted on the fixed pin 76, can move. The crankpin 78 is rigidly connected to lever 77. It engages not only the slot 79 of a rod 80, but also forms the fulcrum of a double-armed lever 81. This double-armed lever engages on the one hand with the sleeve 82 of the centrifugal governor 83 and on the other hand with the pin 84 in the slot 85 of a rod 86. Both the rod 80 and the rod 86 are mounted upon a pin 87 carried on the lever 89, which swings about the fixed pin 88. The rod 71 of the fuel pump governing device is also linked to the pin 87.

A further device limits the angle of motion of lever 68. In cylinder 90 are placed one spring-loaded piston 91, which is loaded on the inside by the supercharging pressure in pipe 12 acting through pipe 92. The mouth of the stopping fork 94, which narrows towards the inside, limits the adjustment of the lever 68 the more, the nearer the fork 94 is moved towards the lever 68 by the spring 93, when the supercharging pressure in the pipe 12 decreases.

When lever 68 is in the stop position "0," the fuel quantity of the fuel pump is limited by the cam 74 acting through rod 80 in such a way that the internal combustion engine still runs at a speed at which the supercharging compressor 18 produces in pipe 12 a delivery pressure which, even when the vessel travelling at decreased speed or is at a standstill, amounts to at least 60% of the pressure above atmosphere at full speed of the vessel or at full power of the internal combustion engine 1. If for any unforeseen reason the speed of the internal combustion engine 1 should become inadmissibly high, then pin 84 would press upon the — end of slot 85 of rod 86, and would thus further decrease the quantity of fuel. At the same time the contact surface in slot 79 of rod 80 would move away from pin 78.

When the vessel is to move ahead, lever 68 is moved over in the direction of arrow V. In this way the blades 5 of propeller 4 are swung into their ahead position. At the same time the cam 74 moves lever 77 in such a way that the pin 78 is displaced in the direction of the arrow 95. The lever 89 is then displaced by spring 96 in the + direction of the double-headed arrow 72 in such a way that rod 80 remains with the inside of its slot 79 pressing upon pin 78. Rod 71 is thus also adjusted in the + direction of arrow 72, so that the internal combustion engine 1 receives an increased quantity of injected fuel. The stopping fork 94 limits the motion of the lever in such a way that the propeller 4 cannot oppose too high a moment to the internal combustion engine 1. The form of the cam 74 and the amount which the mouth of the fork 94 narrows towards the inside are so chosen that, when the propeller blades 5 are adjusted, in accordance with the increased turning moment so much more fuel is injected into the working cylinders that the speed of the internal combustion engine 1 remains high enough to keep the pressure of the supercharging air above the figure of 60% of the pressure above atmosphere at full power.

If the vessel is to be adjusted for motion astern, the lever is moved over from the stop position "0" in the direction of arrow R. On account of the nearly symmetrical form of the cam 74, the same adjustment of the coupling device and of the device for governing the internal combustion engine is obtained as for motion ahead, while the blades 5 of propeller 4 are set in the opposite direction. With the internal combustion engine 1 continuing to rotate in the same direction, as indicated by arrow 69, the vessel is now driven astern. For motion astern also, the form of the cam 74 and the adjustment of stopping fork 94 are chosen so that the speed of the internal combustion engine cannot fall beyond the point at which at least 60% of the full load pressure is maintained in pipe 12.

In order that not only the mechanical but also a thermal overstressing of the engine 1 may be avoided, the linkage operated by the lever 27 in Fig. 3 may be used for the fuel regulation by the cam 74 in place of the lever 77 with its attached linkage. The lever 27 would then be provided with a roller 75 (Fig. 8) working with the cam 74, this roller replacing the handle. In a design of this kind, the lever 68 (Fig. 8) then actuates the rod 28 (Fig. 3).

Further, the turbo set 7, 18 in Fig. 8 may also be driven by means of transmission gearing 65a, Fig. 9, from the gear 65, an intermediate overtaking coupling 21 being provided, as in Fig. 6, so that when the speed of the turbine 7 is too low, the overtaking coupling 21 comes into action and transmits power from the engine 1 to the blower 18.

The supercharging plant in Fig. 8 may consist of the compressor 2 alone, the turbine 7 being direct coupled to the engine 1 by the gears 65 and 65a without the coupling 21. The exhaust gases from the engine 1 are supplied through the exhaust pipe 8 to the turbine 7 after having given up their energy in the turbine 7, these pass in an expanded state through the exhaust pipe 9 to atmosphere.

In this case the reciprocating compressor 2 draws air from atmosphere through the suction valves situated in a suction chamber. The compressed air passes from the pressure chamber, into which the delivery valves open, through the air pipe 12 and into the cylinders of the engine 1.

The engine 1, Fig. 10, is connected by means of the gear 65 with the propeller shaft 3 and the propeller 4 with its adjustable blades 5. The supercharging plant takes the form of the turbine 7 and the blower 18 driven by it, an electric motor 19 which is connected up to the vessel's electric system working on the same shaft.

The exhaust-gas pipe 8 leads to the turbine 7, from which the exhaust gases escape through the pipe 9. The blower 18 is connected to the engine 1 through the pipe 12. The motor 19 is so designed that it can, in accordance with the increasing speed of the turbo set 7, 18, follow the change of speed when the load on the internal combustion engine 1 increases. Although the motor is continuously connected to the electric system, the energy it absorbs, at least at higher loads of the engine 1, is nevertheless small or may be nil, as long as the output of the turbine 7 corresponds to its load by the compressor 18.

The adjusting device 15 of the adjustable propeller 4 of the plant as shown in Fig. 10 is connected to the piston 97 of a servomotor 98. The control medium supplied and led off through pipes 99 and 100 is controlled, according to the position of the rotary valve 101, either by the valve 102 or by the valve 103. The two latter valves are linked to the return-motion lever 106 at the points 104 and 105. Further, the return-motion lever is connected by means of a link at the point 107 to the rod 108, which in its turn is linked to the adjusting lever 109.

The governing device 71 of the internal combustion engine 1 is connected to lever 112 by way of the bell-crank lever 110 and the rod 111. The lever 109 is pressed against the bearing surface 113 of lever 112 by means of the spring 114. By means of a pawl 115 the lever 112 can be fixed at any position desired along the notched segment 116.

The position shown in Fig. 10 is with the vessel at a standstill and the internal combustion engine running in readiness for motion ahead. The reversing lever 117 connected to the rotary valve 101 is here in the position V and the two levers 109 and 112 are in the position "0." In this position pipes 99 and 100 are connected by way of the rotary valve 101 to the casing of valve 102. The fulcrum 107 of lever 106 is placed by lever 109 in a position at which the piston of the servomotor is at its middle position and the propeller blades are perpendicular to the axis of rotation of the propeller, so that neither an ahead nor an astern drive comes into effect. The internal combustion engine then runs at a speed which is high enough to ensure a supercharging pressure which is at least 60% of the pressure above the atmosphere at full power.

If the vessel is to be driven ahead, lever 112 is first moved over to position 10. The internal combustion engine now receives an increased quantity of fuel, which is again so limited by the governor 83 that no inadmissible speed of rotation is reached. Thereupon lever 109 can be released at point 118. The spring 114 then presses it against the stop on lever 112. Thus the valve 102 is so displaced that the pressure medium supplied through the pipe 119 can pass by way of the rotary valve 101 into the pipe 99. The adjusting device 15 of the adjustable propeller 4 is thereby displaced by means of piston 97 in the direction of the arrow V. The lever 106 also moves in the same direction until the valve 102 is again returned to its middle position, where no further displacement of the piston 97 and thus of the adjusting device 15 takes place. Each position of lever 109 brings about a certain position of the adjusting device 15 for the propeller blades 5.

If the vessel is to be driven astern, the lever 117 is moved over to the position R. In this way the pipes 99 and 100 are connected with the casing of valve 103. If a certain speed for the vessel is now set by means of the fuel lever 112 and the lever 109, the valve 103 is adjusted so that pressure medium can pass out of the supply pipe 120 through slide valve 101 into pipe 100. This displaces the piston 97 and the adjusting device 15 in the direction of the arrow R. The accompanying adjustment of the lever 106 thereupon presses the valve 103 back into its middle position, where no further control medium can be supplied to the piston 97.

The transmission ratios of the levers 106, 109 and 112 are so chosen that, by the adjustment of the propeller blades, at every part load of the internal combustion engine a speed is ensured at which the supercharging pressure amounts to at least 60% of the supercharging pressure above the atmosphere at full power, so that the ignition lags cannot become more than three times the figure at normal load.

To the lever 112 is further connected a regulating device for influencing the speed of the auxiliary direct-current motor 19. This regulating device comprises the yoke 125, which is connected through the spring system 126, 127 and the piston rod 128 to the piston 130 of a fixed cataract 131. On the yoke 125 is a contact spring 132, which lies against the contact piece 133 and is provided in the middle with an insulating piece 134.

When the lever 112 is adjusted, either the spring 126 alone or the spring 127 alone is compressed. The contact piece 133 leaves the insulating piece 134 and makes contact with the contact spring 132, whereupon the levers 137, 138 are moved through a switching system 135, 136 and a displacement of the brushes of the motor 19 is thus effected, as a result of which the speed of this motor is increased. The piston 130 with the bore 129 moves in the same direction as the yoke 125 was moved, so that after some time the contact piece 133 again lies against the insulating piece 134, the current is interrupted and the lever 137 and 138 and thus the brushes of the motor 19 again take up their original position. In the meantime the engine 1 has also reached the new load and the speed of the turbine 7 and the supercharging pressure in the pipe 12 is adapted to this new load.

The same device 125—138 may be connected to the rod 28, Fig. 3, when instead of the gear 20 a direct current motor 19 is provided.

Fig. 11 shows a variation in the arrangement of the compressors in Fig. 8. The reciprocating compressor 2 is working as primary compressor when the valve 140 is closed. When the overflow valve 140 is opened, the compressor 18 is cut out. In another variation in Fig. 12 the exhaust gases of the engine 1 drive a set consisting of the exhaust-gas turbine 7 and the compressor 18. The compressor 18 and a second separately driven compressor 141, which works in parallel with it, deliver to the supercharging pipe 12. The compressor 141 a reciprocating or any type of rotary compressor, is driven by means of an auxiliary power unit 142, for instance a steam turbine, an electric motor or an auxiliary internal combustion engine. The internal combustion engine 1 may be of any type; thus it may have a single row of cylinders or several rows, or may be an opposed-piston engine. Moreover, instead of one exhaust-gas turbine and a compressor driven by it, several sets may be provided, which may, if required, be connected to separate cylinders and have any desired switching system.

I claim:

1. In a power plant for ship propulsion, the combination of a two-cycle internal combustion engine having fuel supply means, a gas turbine connected with the exhaust manifold of said engine for receiving gas therefrom, and an air compressor connected to and receiving its driving power from said gas turbine and connected with said engine for combustion air supply thereto, the relative operating characteristics of said engine, turbine and compressor being such that said compressor draws a volume of air amounting to more than twice and delivers it in compressed state to said engine at a volume amounting to less than twice its swept volume, at one revolution of said engine and when it operates at full load, control means connected with said fuel supply means for controlling the fuel supply to said engine, a variable pitch propeller connected to and driven by said engine and having a pitch changing mechanism, manually operable means permanently connected with and positioning said pitch changing mechanism, a link connected with said manually operable means and having a pin at its free end, connecting means connected with said fuel control means and with said pitch changing mechanism and comprising a terminal slot receiving said pin and affording free movement of said manually operable means without affecting said fuel supply means at predetermined operating conditions of said connecting means, and means responsive to the pressure of the air delivered by said compressor to said engine and interposed in said connecting means and adapted to overrule the operation of said pitch changing means by said manually operable means at all times.

2. In a power plant for ship propulsion, the combination of a two-cycle internal combustion engine, a gas turbine connected to and operated by exhaust gas from said engine, an air compressor connected to and driven by said turbine and connected with said engine for supplying combustion air thereto, the relative operating characteristics of said engine, turbine, and compressor being such that said compressor draws a volume of air amounting to more than twice and delivers it in compressed state to said engine at a volume amounting to less than twice its swept volume, at one revolution of said engine and when it operates at full load, an electric motor connected with said compressor for supplying auxiliary driving power, a variable pitch propeller connected to and driven by said engine, pitch changing means connected with said propeller, and motor speed control means connected with said motor and with said pitch changing means for correlating the speed of said motor and compressor and the position of said pitch changing means.

3. In a power control system for a marine power plant comprising a variable pitch propeller, an internal combustion engine driving said propeller and having fuel supply means, and an air compressor receiving its driving power from said combustion engine and delivering compressed combustion air to said engine at a pressure which is coordinated with the speed thereof: a pitch changing mechanism, a power output control mechanism connected with said fuel supply means, actuating means common to both mechanisms and comprising a one-way effective connecting means operative over the whole range of movement of said actuating means and adapted to connect said fuel supply control mechanism and said pitch changing mechanism upon movement of said actuating means in the direction effecting a decrease of power output of the plant and suspending connection of said fuel supply control mechanism and said pitch changing mechanism upon movement of said actuating means in the opposite direction.

4. In a power control system for a marine power plant comprising a variable pitch propeller, an internal combustion engine driving said propeller and having fuel supply means, and an air compressor receiving its driving power from said combustion engine and delivering compressed combustion air to said engine at a pressure which is coordinated with the speed thereof: a pitch changing mechanism, a power output control mechanism connected with said fuel supply means, an actuating member common to both said mechanisms and permanently connected with said pitch changing mechanism, a one-way effective connecting means connecting said fuel supply control mechanism and said actuating member upon movement of the latter in a direction effecting a decrease of the power output of the plant and suspending connection of said fuel supply control mechanism and said actuating member upon movement of the latter in the opposite direction, and means connecting said pitch changing mechanism and said fuel supply control mechanism for making the latter dependent on the position of the former.

5. In a power control system for a marine power plant comprising a variable pitch propeller, an internal combustion engine driving said propeller and having fuel supply means, and an air compressor receiving its driving power from said combustion engine and delivering compressed combustion air to said engine at a pressure which is coordinated with the speed thereof: a pitch changing mechanism, a power output control mechanism connected with said fuel supply means, an actuating member common to both said mechanisms and permanently connected with said pitch changing mechanism, a one-way effective connecting means connecting said fuel supply control mechanism and said actuating member upon movement of the latter in a direction effecting a decrease of the power output of the plant and suspending connection of said fuel supply control mechanism and said actuating member upon movement of the latter in the opposite direction, and means responsive to the combustion air pressure and permanently connected with and controlling the operation of both said mechanisms at all times.

6. In a power control mechanism as set forth in claim 5, means connecting said pitch changing mechanism and said fuel supply control mechanism and having said combustion air pressure responsive means interposed therein.

7. In a power control system for a marine power plant comprising a variable pitch propeller, an internal combustion engine driving said propeller and having fuel supply means, and an air compressor receiving its driving power from said combustion engine and delivering compressed combustion air to said engine: a variable speed motor connected with said compressor for supplying supplemental driving power thereto and having speed changing means, a pitch changing mechanism, a power output control mechanism connected with said fuel supply means, actuating means common to both said mechanisms and comprising a one-way effective connecting means connecting said fuel supply control mechanism and said pitch changing mechanism upon movement of said actuating means in the direction effecting a decrease of power output of the plant and suspending connection of said fuel supply control mechanism and said pitch changing mechanism upon movement of said actuating means in the opposite direction, and connecting means interconnecting said actuating means and said speed changing means for changing the speed of said motor upon actuation of said actuating means.

8. In a power control system as defined in claim 7, clutch means interposed in said connecting means and comprising yielding clutch engaging means for connecting said actuating means and said speed changing means upon actuation of said actuating means and comprising resilient disengaging means counteracting said engaging means upon cessation of actuation of said actuating means.

FRITZ ROESCH.

REFERENCES CITED

The following references are of record in the file of this patent:

UNITED STATES PATENTS

| Number | Name | Date |
|---|---|---|
| Re. 15,888 | McCauley | Aug. 5, 1924 |
| 2,115,485 | Dodson | Apr. 26, 1938 |
| 2,164,545 | Rogers | July 4, 1939 |
| 2,217,364 | Halford et al. | Oct. 8, 1940 |
| 2,231,292 | Neugebauer | Feb. 11, 1941 |
| 2,280,835 | Lysholm | Apr. 28, 1942 |
| 2,306,953 | Jung | Dec. 29, 1942 |
| 2,321,025 | Hammond | June 8, 1943 |
| 2,336,844 | Buck | Dec. 14, 1943 |
| 2,342,410 | Lieberherr | Feb. 24, 1944 |
| 2,384,353 | Stieglitz | Sept. 4, 1945 |
| 2,389,003 | Schorn | Nov. 13, 1945 |
| 2,396,618 | Stieglitz et al. | Mar. 12, 1946 |
| 2,402,885 | Gilfillan et al. | June 25, 1946 |
| 2,443,717 | Birman | June 22, 1948 |

FOREIGN PATENTS

| Number | Country | Date |
|---|---|---|
| 181,043 | Switzerland | Nov. 30, 1935 |
| 206,845 | Great Britain | Feb. 21, 1924 |
| 215,808 | Switzerland | July 15, 1941 |
| 399,520 | Great Britain | Oct. 6, 1933 |
| 435,928 | Germany | Aug. 19, 1923 |
| 436,492 | Great Britain | Oct. 11, 1935 |
| 513,971 | Great Britain | Oct. 26, 1939 |
| 540,774 | Great Britain | Oct. 29, 1941 |
| 638,367 | Germany | Oct. 29, 1936 |
| 852,019 | France | Oct. 16, 1939 |

OTHER REFERENCES

"Supercharging Two-Stroke Engines," from the Power and Works Engineer, August 1942 (pages 211, 212, 213 and 218).

"The Supercharging of Two-Stroke Diesel Engines," from the Sulzer Technical Review, December 31, 1941 (pages 1–21 inclusive), published by Sulzer Bros., Ltd.